Nov. 23, 1937.    H. CHIBNIK    2,099,796
CULTIVATOR SHOVEL
Filed July 11, 1936    3 Sheets-Sheet 1
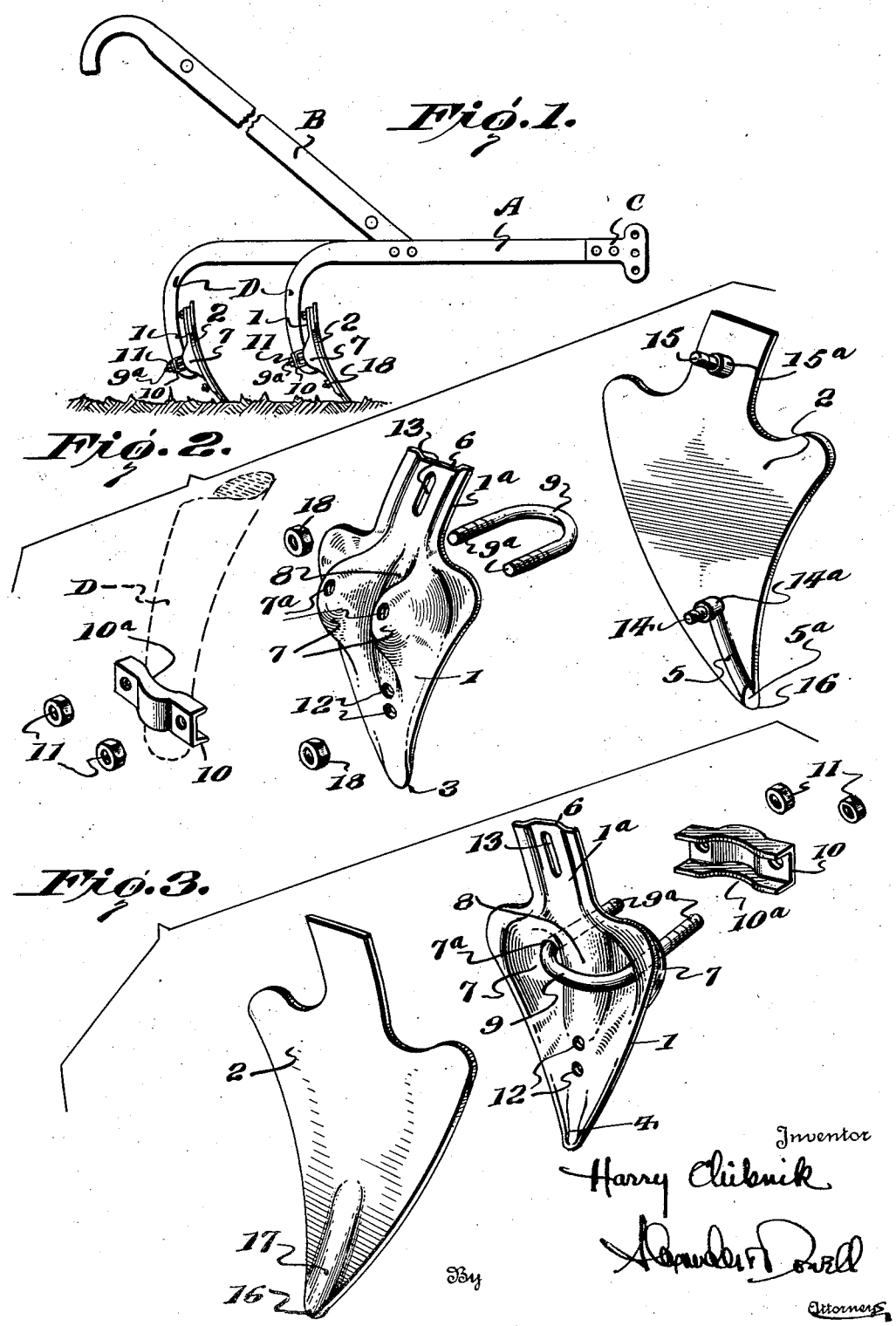

Nov. 23, 1937.    H. CHIBNIK    2,099,796
CULTIVATOR SHOVEL
Filed July 11, 1936    3 Sheets-Sheet 2
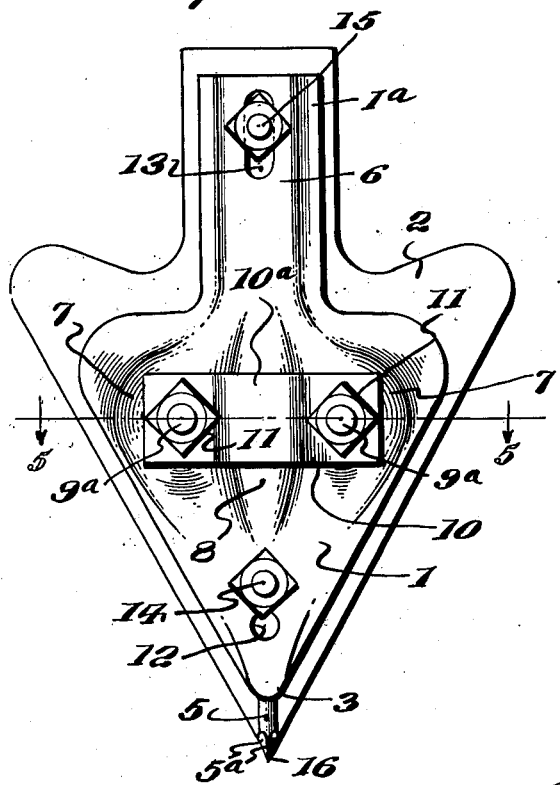

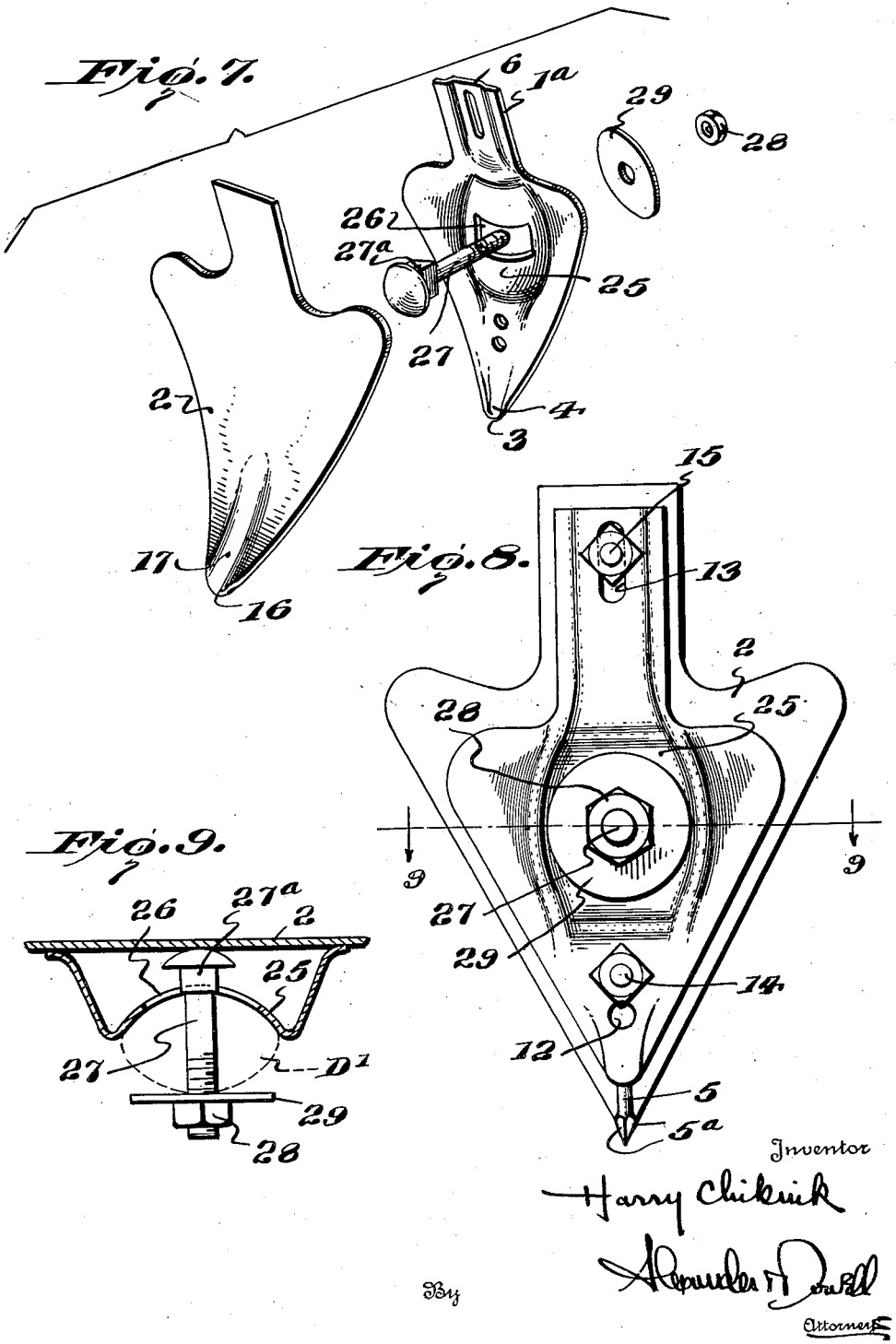

Patented Nov. 23, 1937

2,099,796

UNITED STATES PATENT OFFICE 2,099,796

CULTIVATOR SHOVEL

Harry Chibnik, Sioux Falls, S. Dak.

Application July 11, 1936, Serial No. 90,176

16 Claims. (Cl. 97—203)

This invention relates to cultivator shovels, the present invention being an improvement upon the cultivator shovel shown in my United States Letters Patent No. 1,872,072, dated August 16, 1932; and the principal object of the invention is to provide an improved cultivator blade, and a novel mounting for the blade adapted to be clamped to the cultivator, the mounting having a concave front face with its peripheral portions adapted to contact squarely with the rear face of the blade adjacent its edges.

A further object is to provide a cultivator shovel in which the blade, which has an axially disposed rib on its front face, also is provided with an axially disposed vertical rib or member extending from its rear face adjacent the point of the blade directly opposite the rib on the front face, to increase the thickness of the material at the point of the shovel and thereby reduce wear at the point; also to provide a cultivator shovel in which the mounting has an axially disposed groove in its front face to receive the rib on the rear face of the blade to center the blade on said mounting.

A further object is to provide the blade with spaced vertically aligned studs extending from its rear face adapted to pass through series of vertically disposed perforations or slots in the mounting, whereby the blade is demountable and adjustable on the mounting.

Further objects of the invention are to provide a blade and mounting which are comparatively inexpensive to manufacture and may be installed as a unit on the shovel supports of the cultivator; also to provide blades and mountings which are strong, durable and reliable for their intended purpose, and which require no modification of the cultivator shovel supports.

Other minor objects of the invention will be hereinafter set forth.

I will explain the invention with reference to the accompanying drawings which illustrate several practical embodiments thereof to enable others to adopt and use the same; and in the claims I will summarize the novel features of construction and novel combinations of parts for which protection is desired, it being understood that changes, variations and modifications may be resorted to without departing from the scope of the claims.

In said drawings:—

Fig. 1 is a side elevation of a conventional cultivator showing my novel mountings and blades applied to the shovel supports thereof.

Fig. 2 is an exploded rear perspective view of one form of my novel mounting and blade, detached.

Fig. 3 is an exploded front perspective view of the mounting and blade shown in Fig. 2.

Fig. 4 is an enlarged rear elevation of the assembled mounting and blade shown in Figs. 2 and 3.

Fig. 5 is a section on the line 5—5, Fig. 4.

Fig. 6 is an exploded rear perspective view of the same blade with a modified mounting.

Fig. 7 is an exploded front perspective view of the blade and mounting shown in Fig. 6.

Fig. 8 is an enlarged rear elevation of the assembled blade and mounting shown in Figs. 6 and 7; and Fig. 9 is a section on the line 9—9, Fig. 8.

Referring to the drawings, the cultivator beam A is provided with the usual rearwardly and upwardly directed handle bars B, and at the front of the beam is a pulling hitch C. Depending from the rear end of beam A are the cultivator shovel supports D of any desired number and arrangement.

As shown in Figs. 1–5, my novel mounting 1 is adapted to be clamped to a shovel support D, said mounting being preferably substantially spade-shaped and substantially symmetrical with but smaller than its related cultivator blade 2 as shown in Fig. 4. Mounting 1 is concave on its front face and convex on its rear face, as shown in Figs. 2 and 3, so that only the peripheral or marginal portion of the mounting contacts squarely with the rear face of blade 2 as shown in Fig. 5, which blade is also substantially spade-shaped. The lower end of mounting terminates in a point 3, and is provided in its front face with a vertical axially disposed groove 4 (Fig. 3) of substantially semi-circular cross-section adapted to receive a correspondingly shaped rib or bar 5 on the rear face of blade 2 as shown in Figs. 2 and 4 to center the blade on the mounting.

Groove 4 in the lower end of mounting 1 extends upwardly until it merges into the general concavity of the mounting as shown in Fig. 3, which concavity embraces substantially the entire area of the mounting except the peripheral or marginal portion. At the upper end of the mounting is a shank 1a of substantial width, provided with an axial groove 6 while the marginal portions of shank 1a are adapted to contact squarely with the rear face of blade 2 as shown in Fig. 4, the groove 6 substantially forming a continuation of groove 4.

In the concave portion of the main body of the mounting substantially at the center thereof are a pair of spaced rearwardly extending bosses 7, disposed transversely of the mounting, the metal between said bosses providing a concave portion 8 (Figs. 2, 3, and 5) in the rear face of the mounting. The spaced bosses 7 are each provided with a perforation 7a for the reception of a leg of a U-bolt 9, which legs are threaded as at 9a. When the legs are passed through the perforations 7a as shown in Fig. 5 the base of the U-bolt 9 will be housed entirely within the general concavity of the front face of the mounting, and the base of the U-bolt 9 will bear against the concave portion 8 disposed between the bosses which will form a seat for the base of the U-bolt, and at the same time the concave portion 8 on the rear face of the mounting will form a convenient seat for receiving the shovel support D, shown in Fig. 5.

The outer ends of the legs of the U-bolt carry a cross-bar 10, of general U-shaped cross-section, having perforations therein for the passage of the legs of the U-bolt, and nuts 11 are also provided on the threaded ends 9a of the legs of the U-bolt whereby the cultivator shovel support D may be clamped between the mounting and the cross-bar. Preferably the cross-bar 10 is formed of pressed metal and is provided at its center with a bulged portion 10a, between the perforations for the legs 9a, the recess better adapting the cross-bar to the shape of the novel support D, and further strengthening the cross-bar.

Mounting 1 is preferably formed of pressed metal and its various grooves and concave and convex portions tend to provide great rigidity and strength to the mounting which supports the blade 2 by contact only at its marginal or peripheral portion. Also by forming the concave portion 8 as an integral part of the mounting, increased strength, and simplicity of construction are realized; and at the same time the construction offers good and ample support for the U-bolt without interference with the blade 2.

Within the concave portion of the mounting 1 are a series of axially disposed perforations 12; also in the groove 6 at the upper end of the mounting 1 is a slot 13, the perforations 12 and slot 13 being adapted to receive the vertically aligned studs 14 and 15 extending from the rear face of the blade 2, for adjustably positioning the blade 2 on the mounting 1. By using the slot 13 (Fig. 5) instead of a series of perforations, variations in the spacing of the studs 14 and 15 when welding same onto the blade 2 will be compensated for, and furthermore use of a slot 13 permits slight bending of the metal of the mounting if same should be sprung during use.

The cultivator blade 2 is preferably of spade-shape and is of somewhat larger area than mounting 1, and terminates at its lower end in a point 16 extending below the point 3 of mounting 1. The outer face of shovel 2 is formed with an axially disposed vertical rib 17 (Figs. 6 and 7) extending upwardly from the point 16 for about one-third the height of the blade, the rib 17 gradually lessening in thickness and finally merging into the plane of the front face of the blade. The rib 17 with rod or bar 5 affixed therein provides an increased thickness of metal at the point of greatest wear of the blade and provides for increased wearing qualities. The rib 17 may be formed by pressing the metal so as to provide a substantially semi-cylindrical groove in the rear face of the blade at its lower end (although if the blade is cast the rib 17 may be formed by merely thickening the material of the front face of the blade at its center adjacent the point).

Rib 17 on the front face of the blade gradually diminishes in thickness so that it actually merges into the front face of the blade. This feature is important as it extends the rounded rib on the rear face of the blade up far enough from the point 16 to receive the bar 5 provided for reinforcement of the blade, but above this point, i. e., where the rib 17 fades away it would serve no useful purpose and might in some cases actually interfere with the proper functioning of the blade in scouring the earth away as the blade is engaged, it being found that dirt tends to gather along the rounded rib about the middle section of the blade and would accumulate towards the upper part of the blade.

On the rear face of blade 2 is the semi-cylindrical bar 5 hereinbefore referred to, which is adapted to fill the groove of the rib 17 formed in the rear face of the blade, the bar 5 extending from the point 16 upwardly to meet the lowermost stud 14 of the blade.

Bar 5 is discontinued above the lowermost stud 14a, and preferably said bar is welded to the enlargement 14a of stud 14, or is formed integrally therewith, and thus rib 5 forms an additional support for the stud. The stud 14 and rib 5 may in some cases be cast in one piece by drop-forging, casting, or by fabrication; or may be in two separate pieces united by welding. The lowermost end of bar 5 is beveled as at 5a on opposite sides in order to assist entry of the lower end of the blade into the ground, the bevel being effected after the rib 5 is attached to the blade and during the process of grinding or shaping the cutting edges of the blade. The lower portion of bar 5 is adapted to enter the groove 4 in mounting 1 and centers the blade on the mounting. Bar 5 also provides additional thickness of material at the point 16 of the blade for increasing wear. If the blade is cast or forged the bar 5 could be cast or made integrally with the blade, whereas if the blade is pressed the member 5 may comprise a bar seated in the groove as aforesaid and retained therein by welding or in any other desired manner.

The pair of vertically aligned studs 14—15 project from the rear face of the blade on the axis thereof; and are adapted to pass through the perforations 12 and slot 13 in the mounting 1, said studs being threaded to receive nuts 18, and the cultivator blade 2 being thus vertically adjustably mounted on the mounting 1. Studs 14 and 15 are preferably attached directly to and form an integral part of the blade, which is an important feature since the studs do not appear upon the front face of the blade as would be the case if the studs were provided with heads which were passed through the blade. Studs 14 and 15 are furthermore provided with enlargements 14a and 15a respectively (Fig. 2) adjacent the blade, said enlargements being of greater width than perforations 12 or slot 13, and of such length that the enlargements will form shoulders which will bear against the mounting in the immediate vicinity of the perforations 12 or slot 13, thereby providing a further support for the blade in the grooved or recessed area adjacent the studs. In the absence of such supporting shoulders 14a and 15a the blade 2 would be drawn into the recessed or concave area of the mounting at points adjacent the studs when the nuts 18 were drawn up sufficiently to maintain the blade in proper adjustment and relation to the said mounting.

Instead of making the thickness of the entire lower portion of blade 2 equal to that of the rib 5, said increased thickness is preferably limited to the axial portion and to the surface immediate to said portion, thereby retaining an efficient point even after considerable wear has been effected on the lower end of the blade.

The enlarged rib 17 extending longitudinally from the point 16 towards the upper edge of the blade provides a reinforcement along the longitudinal median and at the same time provides a thickened point to resist wear whereby the cultivator blade will wear materially longer than the usual cultivator blade by reason of the portions 17 and 5 being disposed at the greatest point of wear.

A modification of the mounting is illustrated in Figs. 6 to 9. In these figures the blade 2 is identical with that shown in Figs. 1 to 5; whereas the mounting 1 is substantially the same with respect to the grooves 4 and 6, the point 3, and shank 1a, and the mounting is concave on its front face and is provided with perforations 12 and slot 13 for receiving the studs 14 and 15 of the blade. But in place of the pair of spaced transversely disposed bosses 7 shown in Figs. 1 to 5, the rear face of the central portion of the cultivator is provided with a pressed substantially cylindrical boss 25 (Fig. 9) forming a cylindrical concavity in the rear face of the mounting. In the cylindrical boss 25 is a slot 26 disposed transversely of the mounting adapted to receive the non-circular portion 27a of a bolt 27, preferably of the so-called "carriage-bolt" type, which is inserted into the slot from the front face of the mounting with the head of the bolt entirely housed within the concave front face of the mounting. Bolt 27 extends through a bore provided in the shovel support D' shown in Fig. 9. The outer end of the bolt is threaded to receive a nut 28, and a washer 29 may be interposed between the nut and shovel support D'. By this construction when the nut is tightened the mounting will be drawn toward the support D and the concavity in the rear face of the mounting formed by boss 25 will receive and conform with the general contour of the shovel support as indicated in Fig. 9. As in the case of the mounting shown in Figs. 1 to 5 the boss 25 of the mounting will greatly strengthen the same, and will impart great rigidity thereto; and at the same time will provide simple and efficient means for anchoring the bolt 27 directly in the mounting.

I claim:—

1. In combination, a cultivator blade having an axially disposed reinforcing rib on its rear face; a mounting adapted to be secured to a cultivator and having an axially disposed groove in its front face receiving the rib; studs extending from the blade, opposite the groove; said groove having perforations therein for the reception of the studs, means on the studs for locking the plates together; and members on the studs of greater width than the perforations and of length equal to the depth of the groove.

2. In combination, a cultivator blade having an axially disposed reinforcing rib on its rear face; a mounting adapted to be secured to a cultivator and having an axially disposed groove in its front face receiving the rib; a stud extending from the rib, the groove having vertically arranged series of perforations therein at its lower end for the reception of the stud, means on the stud for locking the plates together; and a member on the stud of greater width than the perforations and of length to fill the groove between the blade and mounting.

3. In combination, a cultivator blade having an axially disposed reinforcing rib on its rear face; a mounting adapted to be secured to a cultivator and having an axially disposed groove in its front face receiving the rib; studs extending from the blade, the mounting having vertically arranged series of perforations therein for the reception of the studs, means on the studs for locking the plates together, said studs being integral with the blade, and enlargements on the studs of greater width than the perforations and of length equal to the depth of the groove for the purpose specified.

4. In combination, a cultivator blade having an axially disposed reinforcing rib on its rear face; a mounting adapted to be secured to a cultivator and having an axially disposed groove in its front face receiving the rib; studs extending from the rear face of the blade, the mounting having a vertically disposed series of perforations in the lower end of the groove, and having an elongated slot in the upper end of the groove for the reception of the studs, and means on the studs for locking the members together.

5. A cultivator blade having a pointed lower end and a reinforcing rib on its rear face extending upwardly from the apex of the pointed end providing increased thickness at the point for resisting wear; an axially disposed rib on its front face extending upwardly from the apex of the pointed end, said ribs on the front and rear faces extending substantially one-third the height of the blade; and means on the blade for mounting same on a support comprising axially aligned studs extending from the rear face of the blade and integral therewith, the lowermost stud being integral with the rib.

6. A mounting for cultivator blades, said mounting comprising a plate having a pointed lower end and having an axially disposed groove in its front face extending upwardly from the apex of the pointed end; said mounting having a series of perforations in the groove; and means for attaching the mounting to a cultivator shovel support.

7. In a mounting as set forth in claim 6, the mounting being concave on its front face, and the marginal portion of the mounting being adapted to contact with the blade; said concave portion having a transverse slot therein; and said attaching means comprising a bolt extending through the slot and having its head housed within the concave portion between the mounting and blade.

8. In a mounting as set forth in claim 6, the mounting being concave on its front face, and the marginal portion of the mounting being adapted to contact with the blade; said concave portion having a transverse slot therein; said attaching means comprising a bolt extending through the slot and having its head housed within the concave portion between the mounting and blade; and the center of the concave portion having a convex portion adapted to substantially conform with the shape of the cultivator shovel support.

9. In a mounting as set forth in claim 6, the mounting being concave on its front face, and the marginal portion of the mounting being adapted to contact with the blade; and a pair of spaced rearwardly extending bosses in the concave portion disposed transversely of the mounting; and said attaching means comprising a U-bolt having its legs extending through the pair of bosses respectively, and having its base housed within the concave portion between the mounting and blade.

10. In a mounting as set forth in claim 6, the mounting being concave on its front face, and the marginal portion of the mounting being adapted to contact with the blade; a pair of spaced rearwardly extending bosses in the concave portion disposed transversely of the mounting; said attaching means comprising a U-bolt having its legs extending through the pair of bosses respectively, and having its base housed within the concave portion between the mounting and blade; a cross-member on the outer ends of the legs of the U-bolt; and nuts thereon for clamping the cultivator shovel support between the mounting and cross-member.

11. In a mounting as set forth in claim 6, the mounting being concave on its front face, and the marginal portion of the mounting being adapted to contact with the blade; a pair of spaced rearwardly extending bosses in the concave portion disposed transversely of the mounting; said attaching means comprising a U-bolt having its legs extending through the pair of bosses respectively, and having its base housed within the concave portion between the mounting and blade; a cross-member on the outer ends of the legs of the U-bolt; nuts thereon for clamping the cultivator shovel support between the mounting and cross-member, the space between the pair of bosses forming a recess in the rear face of the mounting for receiving the cultivator shovel support.

12. In a mounting as set forth in claim 6, the mounting being concave on its front face, and the marginal portion of the mounting being adapted to contact with the blade; a forwardly extending cylindrical boss at the center of the concave portion having a transverse slot therein; said attaching means comprising a bolt extending through the slot and having its head housed within the concave portion between the mounting and blade.

13. In a mounting as set forth in claim 6, the mounting being concave on its front face, and the marginal portion of the mounting being adapted to contact with the blade; a forwardly extending cylindrical boss at the center of the concave portion having a transverse slot therein; said attaching means comprising a bolt extending through the slot and having its head housed within the concave portion between the mounting and blade; said bolt having a non-circular portion engaging the slot for preventing rotation of the bolt with respect to the mounting.

14. In a mounting as set forth in claim 6, the mounting being concave on its front face, and the marginal portion of the mounting being adapted to contact with the blade; a forwardly extending cylindrical boss at the center of the concave portion having a transverse slot therein; said attaching means comprising a bolt extending through the slot and having its head housed within the concave portion between the mounting and blade, the cylindrical boss forming a recess in the rear face of the mounting for receiving the cultivator shovel support.

15. A mounting for cultivator blades, said mounting comprising a plate having a pointed lower end and having an axially disposed groove in its front face extending upwardly from the apex of the pointed end, and said plate having series of perforations in the groove adjacent its upper and lower end, the plate being concave on its front face, and the marginal portion of the mounting being adapted to contact with the blade; and means entering the concave portion of the plate for mounting same on a cultivator shovel support.

16. A mounting for cultivator blades, said mounting comprising a plate having a pointed lower end and an axially disposed groove in its front face extending upwardly from the apex of the pointed end; and said plate having series of perforations in the groove adjacent its lower end, and having a slot in the groove adjacent its upper end; the plate being concave on its front face, and the marginal portion of the mounting being adapted to contact with the blade; means entering the concave portion of the plate for mounting same on a cultivator shovel support.

HARRY CHIBNIK.